(No Model.)

J. G. WILEY.
COTTON GIN FEEDER.

No. 344,299.  Patented June 22, 1886.

WITNESSES:
C. Neveux
C. Sedgwick

INVENTOR:
J. G. Wiley
BY Munn & Co.
ATTORNEYS.

N. PETERS, Photo-Lithographer, Washington, D.C.

UNITED STATES PATENT OFFICE.

JESSE G. WILEY, OF LOCKHART, TEXAS.

COTTON-GIN FEEDER.

SPECIFICATION forming part of Letters Patent No. 344,299, dated June 22, 1886.

Application filed September 4, 1885. Serial No. 176,171. (No model.)

*To all whom it may concern:*

Be it known that I, JESSE G. WILEY, of Lockhart, in the county of Caldwell and State of Texas, have invented a new and improved Cotton-Gin Feeder, of which the following is a full, clear, and exact description.

The object of my invention is to provide a new and improved cotton-gin feeder which is simple in construction, does not occupy much space, always remains in position, and which feeds rapidly.

This invention consists in the combination, in a cotton-gin feeder, of a rectangular inclined box, spiked feeding-belts, the revolving fan-blower at the upper end of the box, and a screen placed at the opposite end and lower side of the box, substantially as and for the purpose herein set forth.

Reference is to be had to the accompanying drawings, forming part of this specification, in which similar letters of reference indicate corresponding parts in both the figures.

Figure 1:
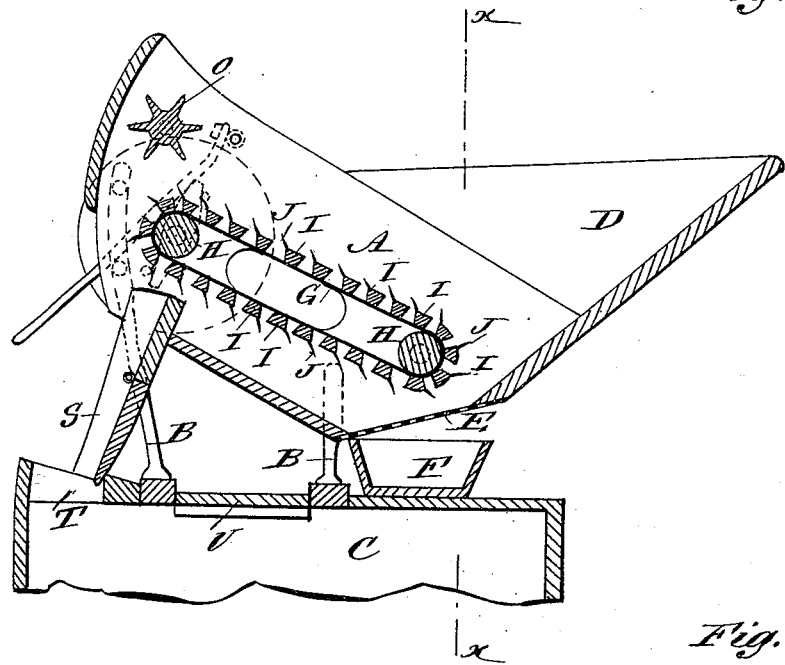
Figure 2:
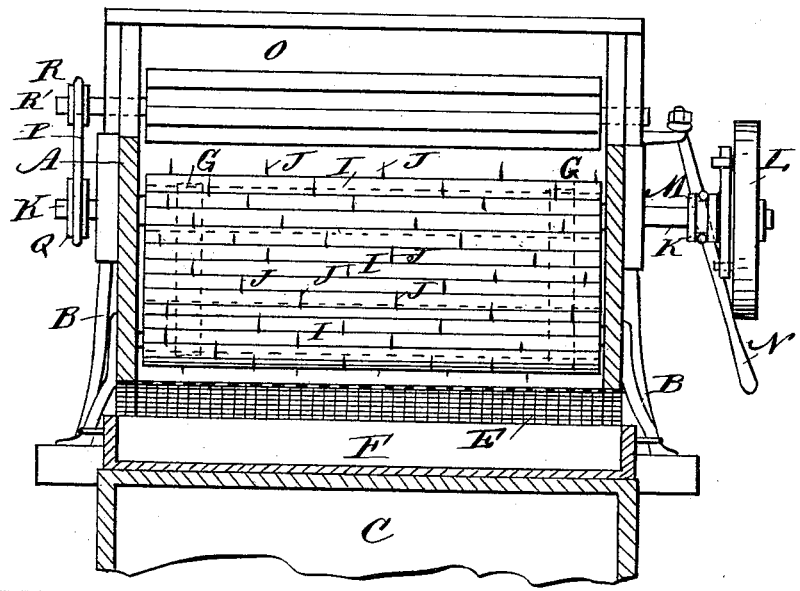

Figure 1 is a longitudinal sectional elevation of my improved cotton-gin feeder. Fig. 2 is a cross-sectional elevation of the same on the line $x$ $x$, Fig. 1.

The box A is supported by four legs, B, secured on the top of the gin-frame C, and said box A forms a hopper, D, at the bottom of which the screen E is provided, above a box, F, resting on the top of the gin-frame, for catching the dirt, smut, &c.

Endless belts G are passed over two rollers, H, in the box, and the said belts are united by slats I, from which spikes J project. The upper roller H is provided with a shaft, K, carrying a belt-pulley, L, having a clutch, M, for locking it on the shaft, which clutch is operated and shifted by a lever, N.

A governor or winged roller, O, is journaled in the upper part of the box A, above the upper roller H, and driven from the shaft K by an endless belt, P, passed over a pulley, Q, on the shaft K, and a pulley, R, on the shaft R' of the governor O. This fan-blower O is constructed so as to direct its blast upon the cotton before it leaves the endless spiked feeding-belt G, by which the sand and other fine impurities are blown from the cotton down upon the inclined bottom of the box A, to escape through the screen E, placed at the junction of the bottom and end of the box, as represented in Fig. 1.

A hinged chute, S, is provided below the upper roller H, and conducts the cotton into the opening T in the top of the gin-frame, through which opening the cotton drops upon the gin-saws.

The cotton is raised from the bottom of the box A by the spikes J on the slats I, secured on the endless belts G, and then drops from said spikes down the chute S into the gin.

By giving the fan-blower O a greater or less number of revolutions, by changing the pulleys R', or by using an ordinary cone-pulley, the feed can be regulated very evenly.

The feeder is entirely out of the way, and does not interfere with cleaning and adjusting the saws, brushes, &c.

Having thus described my invention, what I claim as new, and desire to secure by Letters Patent, is—

In combination, in a cotton-gin feeder, a rectangular inclined box, A, endless feeding-belts G, having spiked slats, the revolving fan O at the upper end of the inclined box A, and screen E at the opposite end and lower side of the box, through which the sand and dirt from the cotton may escape, the current of air from the revolving fan O assisting in expelling the sand and dirt, the latter falling between the slats and down the inclined bottom of the box A, and out through the screen E, substantially as herein described and shown.

JESSE G. WILEY.

Witnesses:
W. R. SMITH,
B. T. PALMER.